US010955621B2

(12) United States Patent
Prevratil et al.

(10) Patent No.: US 10,955,621 B2
(45) Date of Patent: Mar. 23, 2021

(54) SPLICE TRAY FOR OPTICAL FIBERS (71) Applicant: CORNING RESEARCH & DEVELOPMENT CORPORATION, Corning, NY (US)

(72) Inventors: Karyne Poissant Prevratil, Fort Worth, TX (US); Diana Rodriguez, Fort Worth, TX (US); Jacob Silverman, Watauga, TX (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/844,146

(22) Filed: Apr. 9, 2020

(65) Prior Publication Data
US 2020/0233172 A1 Jul. 23, 2020

Related U.S. Application Data (63) Continuation of application No. PCT/US2018/056266, filed on Oct. 17, 2018.
(Continued)

(51) Int. Cl.
*G02B 6/36* (2006.01)
*G02B 6/42* (2006.01)
(Continued)

(52) U.S. Cl.
CPC ......... *G02B 6/3628* (2013.01); *G02B 6/3825* (2013.01); *G02B 6/4284* (2013.01); *G02B 6/4452* (2013.01); *G02B 6/4455* (2013.01)

(58) Field of Classification Search
CPC ... G02B 6/3628; G02B 6/3625; G02B 6/4284
(Continued)

(56) References Cited

U.S. PATENT DOCUMENTS 4,792,203 A * 12/1988 Nelson ............... G02B 6/24
385/134
4,898,448 A * 2/1990 Cooper ............... G02B 6/4452
385/135
(Continued)

FOREIGN PATENT DOCUMENTS

WO        03104873 A1    12/2003
WO    2012171864 A1    12/2012

OTHER PUBLICATIONS

International Search Report and Written Opinion of the International Searching Authority; PCT/US2018/056266; dated Dec. 20, 2018; 9 Pages; ISA/US Commissioner for Patents.
(Continued)

*Primary Examiner* — Kaveh C Kianni
(74) *Attorney, Agent, or Firm* — Grant A. Gildehaus (57) ABSTRACT A splice tray may include a tray base including a base panel and flange associated with a perimeter of the base panel and extending outward from the base panel. The splice tray may also include a flexible latch extending from an outer surface of the flange of the tray base. The latch may selectively prevent and allow the splice tray to pivot with respect to a splice tray assembly in which the splice tray is received. The splice tray may also include a splice holder configured to hold a plurality of spliced optical fibers. The splice holder may include a holder base coupled to the tray base, and a plurality of ribs associated with the holder base and defining a plurality of recesses configured to receive at least one spliced optical fiber. The splice tray may also include a cover removably coupled to the tray base and/or splice holder.

15 Claims, 6 Drawing Sheets

Related U.S. Application Data (60) Provisional application No. 62/573,381, filed on Oct. 17, 2017.

(51) Int. Cl.
*G02B 6/38* (2006.01)
*G02B 6/44* (2006.01)

(58) Field of Classification Search
USPC .......................................................... 385/136
See application file for complete search history.

(56) References Cited

U.S. PATENT DOCUMENTS

| | | | | |
|---|---|---|---|---|
| 4,911,514 A * | 3/1990 | Okada | ................... | G02B 6/2808 385/39 |
| 5,071,211 A * | 12/1991 | Debortoli | ............. | G02B 6/4452 174/50 |
| 5,100,221 A * | 3/1992 | Carney | ................ | G02B 6/4452 385/135 |
| 5,142,606 A * | 8/1992 | Carney | ................ | G02B 6/4452 385/134 |
| 5,181,044 A * | 1/1993 | Matsumoto | ........... | H01Q 1/3275 343/700 MS |
| 5,323,480 A * | 6/1994 | Mullaney | .............. | G02B 6/4442 385/135 |
| 5,402,515 A * | 3/1995 | Vidacovich | ........... | G02B 6/4452 385/135 |
| 5,440,666 A * | 8/1995 | Burek | ................... | G02B 6/4454 385/134 |
| 5,519,804 A * | 5/1996 | Burek | ................... | G02B 6/3878 385/134 |
| 5,734,776 A * | 3/1998 | Puetz | ................... | G02B 6/4442 385/134 |
| 5,742,982 A * | 4/1998 | Dodd | ...................... | F16G 11/00 24/16 R |
| 5,835,657 A | 11/1998 | Suarez et al. | | |
| 5,862,290 A * | 1/1999 | Burek | ................... | G02B 6/3801 385/134 |
| 5,946,440 A * | 8/1999 | Puetz | ................... | G02B 6/4455 385/135 |
| 6,112,006 A * | 8/2000 | Foss | ..................... | G02B 6/4442 385/135 |
| 6,215,938 B1 * | 4/2001 | Reitmeier | ............ | G02B 6/4441 385/134 |
| 6,282,360 B1 | 8/2001 | Milanowski et al. | | |
| 6,311,007 B1 * | 10/2001 | Daoud | .................. | G02B 6/4454 385/135 |
| 6,424,782 B1 * | 7/2002 | Ray | ...................... | G02B 6/4471 385/135 |
| 6,533,472 B1 * | 3/2003 | Dinh | .................... | G02B 6/4447 385/135 |
| 7,045,710 B1 * | 5/2006 | Allen | ................... | G02B 6/4442 174/38 |
| 7,310,471 B2 * | 12/2007 | Bayazit | ................ | G02B 6/4471 385/134 |
| 7,376,325 B1 * | 5/2008 | Cloud | .................... | G02B 6/445 385/134 |
| 8,213,761 B2 * | 7/2012 | Gronvall | .............. | G02B 6/4441 385/135 |
| 8,953,924 B2 * | 2/2015 | Cote | .................... | G02B 6/4471 385/137 |
| 9,140,870 B2 * | 9/2015 | Marmon | ............. | G02B 6/4454 |
| 9,791,653 B2 * | 10/2017 | Aznag | ................. | G02B 6/4452 |
| 9,851,524 B2 * | 12/2017 | Vongseng | ........... | G02B 6/4455 |
| 2005/0271344 A1 * | 12/2005 | Grubish | ................ | G02B 6/445 385/135 |
| 2006/0032659 A1 * | 2/2006 | Allen | ................... | H02G 3/105 174/92 |
| 2006/0034578 A1 * | 2/2006 | Allen | ................... | H01L 29/49 385/135 |
| 2006/0215980 A1 * | 9/2006 | Bayazit | ................ | G02B 6/4454 385/135 |
| 2007/0047895 A1 * | 3/2007 | Parikh | .................. | H02G 15/013 385/135 |
| 2007/0183732 A1 * | 8/2007 | Wittmeier | ............ | G02B 6/4442 385/135 |
| 2007/0206780 A1 * | 9/2007 | Kerry | ................... | G02B 6/4466 379/413.02 |
| 2008/0298764 A1 * | 12/2008 | Bloodworth | ......... | G02B 6/4452 385/135 |
| 2009/0110359 A1 * | 4/2009 | Smith | ................... | G02B 6/4452 385/135 |
| 2009/0238531 A1 * | 9/2009 | Holmberg | ............ | G02B 6/3897 385/135 |
| 2009/0252472 A1 * | 10/2009 | Solheid | ................ | G02B 6/4454 385/135 |
| 2009/0257726 A1 * | 10/2009 | Redmann | ............... | H04Q 1/021 385/135 |
| 2009/0324189 A1 * | 12/2009 | Hill | ....................... | G02B 6/4454 385/135 |
| 2010/0061693 A1 * | 3/2010 | Bran de Leon | ...... | G02B 6/4454 385/135 |
| 2010/0092147 A1 * | 4/2010 | Desard | ................ | G02B 6/4477 385/135 |
| 2010/0142910 A1 * | 6/2010 | Hill | ....................... | G02B 6/4454 385/135 |
| 2010/0150516 A1 | 6/2010 | Mohrmann et al. | | |
| 2010/0183274 A1 * | 7/2010 | Brunet | ................. | G02B 6/4455 385/135 |
| 2010/0290751 A1 * | 11/2010 | Naudin | ................ | G02B 6/4455 385/135 |
| 2010/0310221 A1 * | 12/2010 | Le Dissez | .......... | H04Q 11/0005 385/135 |
| 2011/0026894 A1 * | 2/2011 | Rudenick | ............... | G02B 6/445 385/135 |
| 2011/0164854 A1 * | 7/2011 | Desard | ................ | G02B 6/4455 385/135 |
| 2011/0181158 A1 * | 7/2011 | Bran de Leon | ...... | G02B 6/4445 312/107 |
| 2011/0268415 A1 * | 11/2011 | Fabrykowski | ....... | G02B 6/4471 385/135 |
| 2012/0134639 A1 * | 5/2012 | Giraud | ................. | G02B 6/4454 385/135 |
| 2012/0230646 A1 * | 9/2012 | Thompson | ........... | G02B 6/3887 385/135 |
| 2013/0108225 A1 * | 5/2013 | Ray | ...................... | G02B 6/4454 385/95 |
| 2013/0214662 A1 * | 8/2013 | Pimentel | .............. | G02B 6/4454 312/330.1 |
| 2013/0322839 A1 * | 12/2013 | Claessens | ........... | G02B 6/4455 385/135 |
| 2014/0079366 A1 * | 3/2014 | Rodriguez | ............... | G02B 6/36 385/136 |
| 2014/0314388 A1 * | 10/2014 | Alaerts | ................ | G02B 6/4471 385/135 |
| 2015/0117829 A1 * | 4/2015 | Allen | ................... | G02B 6/4452 385/135 |
| 2015/0253528 A1 * | 9/2015 | Corbille | ............... | G02B 6/4454 385/135 |
| 2015/0286022 A1 * | 10/2015 | Holmberg | ............ | G02B 6/4452 385/135 |
| 2016/0073181 A1 * | 3/2016 | Abbiati | ............... | H04Q 11/0067 398/45 |
| 2017/0045701 A1 * | 2/2017 | Diepstraten | .......... | G02B 6/4455 |
| 2017/0052338 A1 * | 2/2017 | Claessens | ............ | H02G 15/113 |
| 2017/0059060 A1 * | 3/2017 | Gallion | .................... | H02G 3/32 |
| 2019/0033546 A1 * | 1/2019 | Bandy | .................. | G02B 6/4452 |
| 2019/0064463 A1 * | 2/2019 | Bandy | ................... | G02B 6/445 |
| 2019/0170961 A1 * | 6/2019 | Coenegracht | ........ | G02B 6/4444 |
| 2019/0187395 A1 * | 6/2019 | Solheid | ................ | G02B 6/4455 |

OTHER PUBLICATIONS

Tyco Electronics; Ribbonmaster* Splice Tray Assemblies Instruction Sheet 408-4302; 6 Pages; (2008);te.com.

* cited by examiner

SPLICE TRAY FOR OPTICAL FIBERS

CLAIM OF PRIORITY

This application is a continuation of International Application No. PCT/US18/56266, filed on Oct. 17, 2018, which claims the benefit of priority to U.S. Application No. 62/573,381, filed on Oct. 17, 2017, both applications being incorporated herein by reference.

BACKGROUND

This disclosure relates to splice trays for optical fibers, and more particularly, to splice trays for providing a space for receipt of a plurality of spliced optical fibers.

It is often desirable to splice the ends of one or more optical fibers of a first cable to the ends of one or more optical fibers of a second cable. For example, cables including optical fibers may be used to communicate information from a source to one or more devices. Some such cables may be routed through the environment to a building and enter the building through one or more ducts. The interior of the building may include an internal communication network including one or more cables including optical fibers. The optical fibers from exterior to the building may be spliced to optical fibers in the interior of the building to link the communication from the source to the communication network in the interior of the building.

A splice enclosure may be provided for providing a space for receipt of spliced optical fibers of many cables. For example, a splice tray may be provided for receiving spliced optical fibers, and the splice tray may be received in the splice enclosure. Splicing the optical fibers to one another is often tedious and time consuming, often resulting in significant expense. In addition, as data communication increases and the number of optical fibers grows to accommodate the increase, the capacity of splice enclosures and splice trays may be insufficient to accommodate the splicing of additional optical fibers in an efficient manner. Moreover, as more spliced optical fibers are received in splice trays due to the increase in optical fibers, it may be difficult to perform the splicing and place the spliced fibers into the splice trays in an efficient manner.

Some examples described herein may address one or more possible drawbacks associated with increasing the additional optical fibers and placing the associated increased number of spliced fibers in splice trays.

SUMMARY

According to a first aspect, the present disclosure is generally directed to a splice tray for providing a space for receipt of a plurality of spliced optical fibers of a plurality of cables. The splice tray may include a tray base including a substantially planar base panel having an entry end and a remote end spaced from the entry end, with the base panel defining a perimeter. The tray base may also include a flange associated with the perimeter of the base panel and extending outward from the base panel. The splice tray may also include a splice holder configured to hold a plurality of spliced optical fibers. The splice holder may include a holder base removably coupled to the tray base and a plurality of ribs associated with the holder base and defining a plurality of recesses configured to receive at least one spliced optical fiber. The splice tray may also include a cover removably coupled to at least one of the tray base or the splice holder and substantially enclosing the splice holder between the tray base and the cover.

According to a further aspect, this disclosure is also generally directed to a splice tray for providing a space for receipt of a plurality of spliced optical fibers of a plurality of cables. The splice tray may include a tray base including a substantially planar base panel having an entry end and a remote end spaced from the entry end, with the base panel defining a perimeter. The tray base may also include a flange associated with the perimeter of the base panel and extending outward from the base panel, and a flexible latch extending from an outer surface of the flange of the tray base. The latch may be configured to selectively prevent and allow the splice tray to pivot with respect to a splice tray assembly in which the splice tray is received. The splice tray may also include a splice holder configured to hold a plurality of spliced optical fibers. The splice holder may include a holder base coupled to the tray base, and a plurality of ribs associated with the holder base and defining a plurality of recesses configured to receive at least one spliced optical fiber. The splice tray may also include a cover removably coupled to at least one of the tray base or the splice holder and substantially enclosing the splice holder between the tray base and the cover.

According to another aspect, this disclosure is also generally directed to a splice tray and a transition tube. The splice tray may be configured to provide a space for receipt of a plurality of spliced optical fibers of a plurality of cables. The splice tray may include a tray base including a substantially planar base panel having an entry end and a remote end spaced from the entry end, with the base panel defining a perimeter. The tray base may also include a flange associated with the perimeter of the base panel and extending outward from the base panel. The splice tray may further include a splice holder configured to hold a plurality of spliced optical fibers. The splice holder may include a plurality of ribs defining a plurality of recesses configured to receive at least one spliced optical fiber. The splice tray may also include a cover removably coupled to at least one of the tray base or the splice holder and substantially enclosing the splice holder between the tray base and the cover. The transition tube may be coupled to the tray base and may be configured to receive at least one cable.

DETAILED DESCRIPTION

Reference will now be made in detail to embodiments, examples of which are illustrated in the accompanying drawings. Whenever possible, the same reference numbers are used throughout the drawings to refer to the same or like parts.

This disclosure is generally directed to splice trays for optical fibers and to splice trays for providing a space for receipt of a plurality of spliced optical fibers, and related methods. For example, cables including optical fibers may be used to communicate information from a communication source to one or more devices. Such cables may be routed through the environment to a building or between buildings (e.g., data center buildings) via ducts and enter a building through one or more ducts. As noted above, the interior of the building may include an internal communication network including one or more cables including optical fibers. The optical fibers from exterior to the building may be spliced to optical fibers in the interior of the building to link the communication from a communication source to the communication network in the interior of the building. In some examples, the cables exterior to the building may have different requirements than requirements of the cables inside the building. For example, cables inside a building may need to comply with fire codes and/or other regulations, while cables exterior to the building may not need to comply with such codes and/or other regulations.

A splice enclosure may be provided for providing a space for receipt of many spliced optical fibers of many cables. For example, a splice tray may be provided for receiving spliced optical fibers, and the splice tray may be received in the splice enclosure.

In some examples, the splice tray and related methods described herein may be configured to provide space for accommodating (e.g., storing and/or protecting) splicing of one or more higher fiber-count cables, such as, for example, 1728 fiber-count cables, 3456 fiber-count cables, and/or 6912 fiber-count cables. In some examples, one or more of the cables may be ribbon cables, for example, having optical fibers arranged adjacent to other optical fibers of the cables, such that the adjacent optical fibers are arranged substantially along a line forming a substantially flat ribbon including a plurality of optical fibers. In some examples, the cables may not be ribbon cables. Some examples of the splice trays described herein may accommodate the splicing of additional optical fibers in an efficient manner relative to conventional enclosures. Splicing for different purposes and/or different types of optical fibers is/are contemplated.

Figure 1:
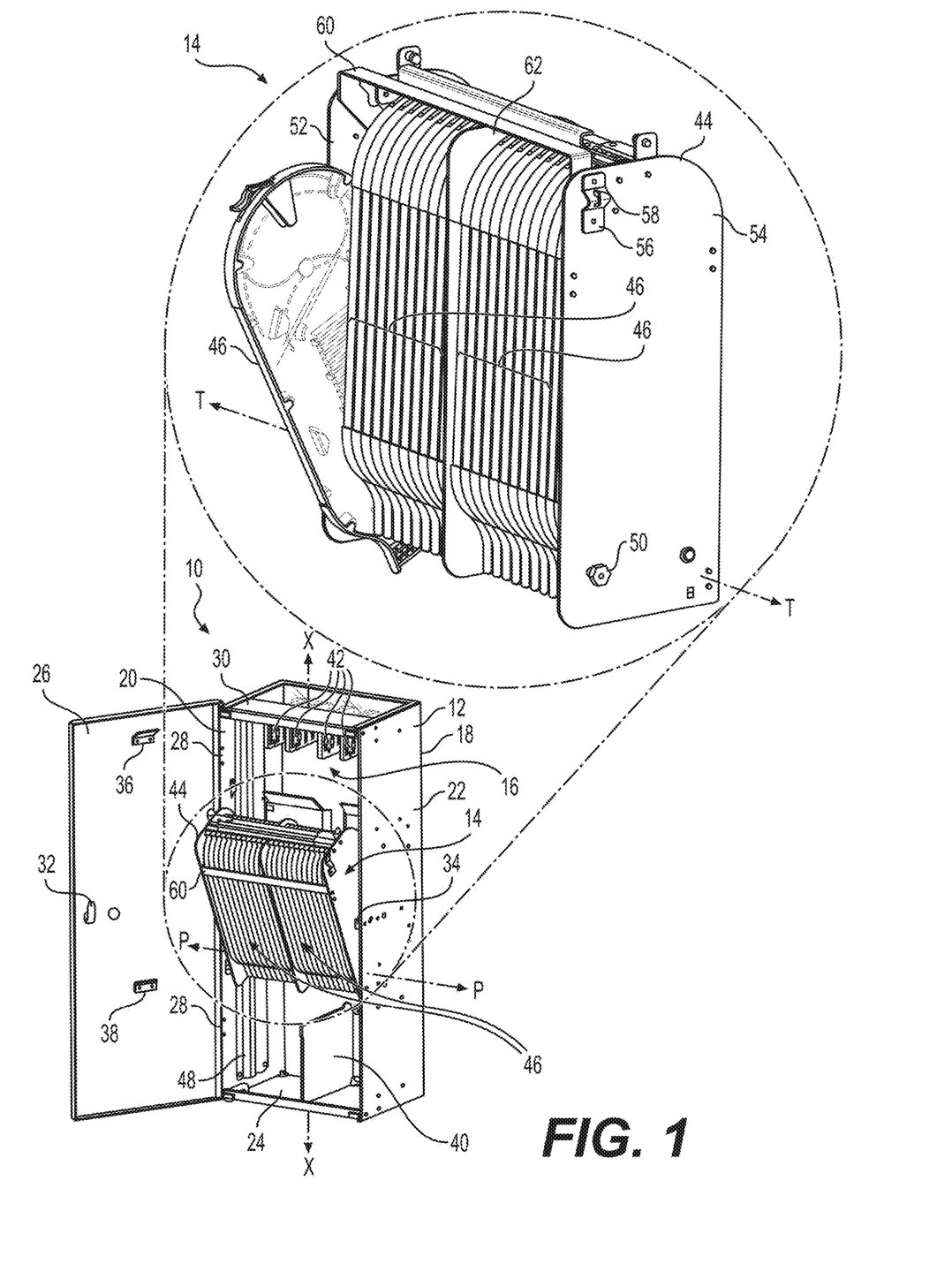
FIG. 1 is a schematic perspective view of an example splice enclosure including an example cabinet and an example splice tray assembly.

FIG. 1 is a schematic perspective view of an example splice enclosure 10 including an example cabinet 12 and an example splice tray assembly 14. In the example shown, the cabinet 12 defines an interior volume 16 and includes a rear wall 18, a first side wall 20 coupled to the rear wall 18, and a second side wall 22 coupled to the rear wall 18 and spaced from the first side wall 20. The example cabinet 12 shown in FIG. 1 also includes a lower wall 24 coupled to the first side wall 20, the second side wall 22, and/or the rear wall 18. In some examples, the lower wall 24 may include knock-outs and/or other structures (e.g., openings) for mounting the cabinet 12 to a support (e.g., a floor or platform) and/or to provide one or more entry points for one of more cables to pass from exterior to the cabinet 12 to the interior volume 16 of the cabinet 12. The example cabinet 12 also includes a front panel 26 coupled to the first side wall 20 and configured to pivot with respect to the first side wall 20. For example, the front panel 26 may serve as a door to gain access to the interior volume 16 of the cabinet 12 and may be mounted on hinges 28 to support the front panel 26 and permit pivoting of the front panel 26 relative to the remainder of the cabinet 12. The example cabinet 12 also includes an upper wall 30 coupled to one or more of the first side wall 20, the second side wall 22, and/or the rear wall 18. In some examples, the upper wall 30, or at least a portion thereof, may be removably coupled to the first side wall 20, the second side wall 22, and/or the rear wall 18, which may render it relatively easier for a technician installing the cables to access the cables as they are routed into the cabinet 12. In some examples, the upper wall 30 may include knock-outs and/or other structures (e.g., openings) for providing one or more entry points for one of more cables to pass from exterior to the cabinet 12 to the interior volume 16 of the cabinet 12. As shown, the cabinet 12 may define a longitudinal axis X extending in a direction substantially parallel to planes in which the rear wall 18 and at least one of the first wall 20 or the second wall 22 lie. Although the terms "rear," "side," "front," "lower," and "upper" have been used for clarity and describing relative relationships among parts, the use of these terms is not intended to be absolute.

As shown in FIG. 1, the cabinet 12 may also include a latch 32 coupled to the front panel 26 and a catch 34 coupled to the second wall 22 and configured to selectively secure the front panel 26 in the closed position. In the example shown, the front panel 26 may also include one or more brackets (e.g., brackets 36 and 38) coupled to an interior side of the front panel 26 and configured to facilitate hanging therefrom cables, splice trays associated with the splice tray assembly 14, and/or other parts related to the splice enclosure 10, which may improve the ease with which a technician may perform splicing or other service-related operations. In some examples, the bracket 36 may be configured to engage the upper wall 30. Some examples of the splice enclosure 10 may include one or more mounting brackets (e.g., coupled to rear wall 18) configured to couple the splice enclosure 10 to a support, such as, for example, a rack or a wall or support of the building in which the splice enclosure 10 is present.

As described in more detail herein, the splice enclosure 10 may also include a divider plate 40 in a lower portion of the cabinet 12 to assist with organizing the optical fibers being spliced. Some examples of the splice enclosure 10 may also include one or more brackets 42 coupled to the cabinet 12 at an end of the cabinet 12 remote from the lower wall 24. For example, the one or more brackets 42 may be coupled to the rear wall 18 via at least one of one or more fasteners, welding, or adhesives. In some examples, the one or more brackets 42 may each include one or more apertures configured to receive a boss associated with a clip configured to be coupled to at least one cable (e.g., via a cable-tie) and the respective bracket 42, for example, as explained in more detail herein.

Figure 2:
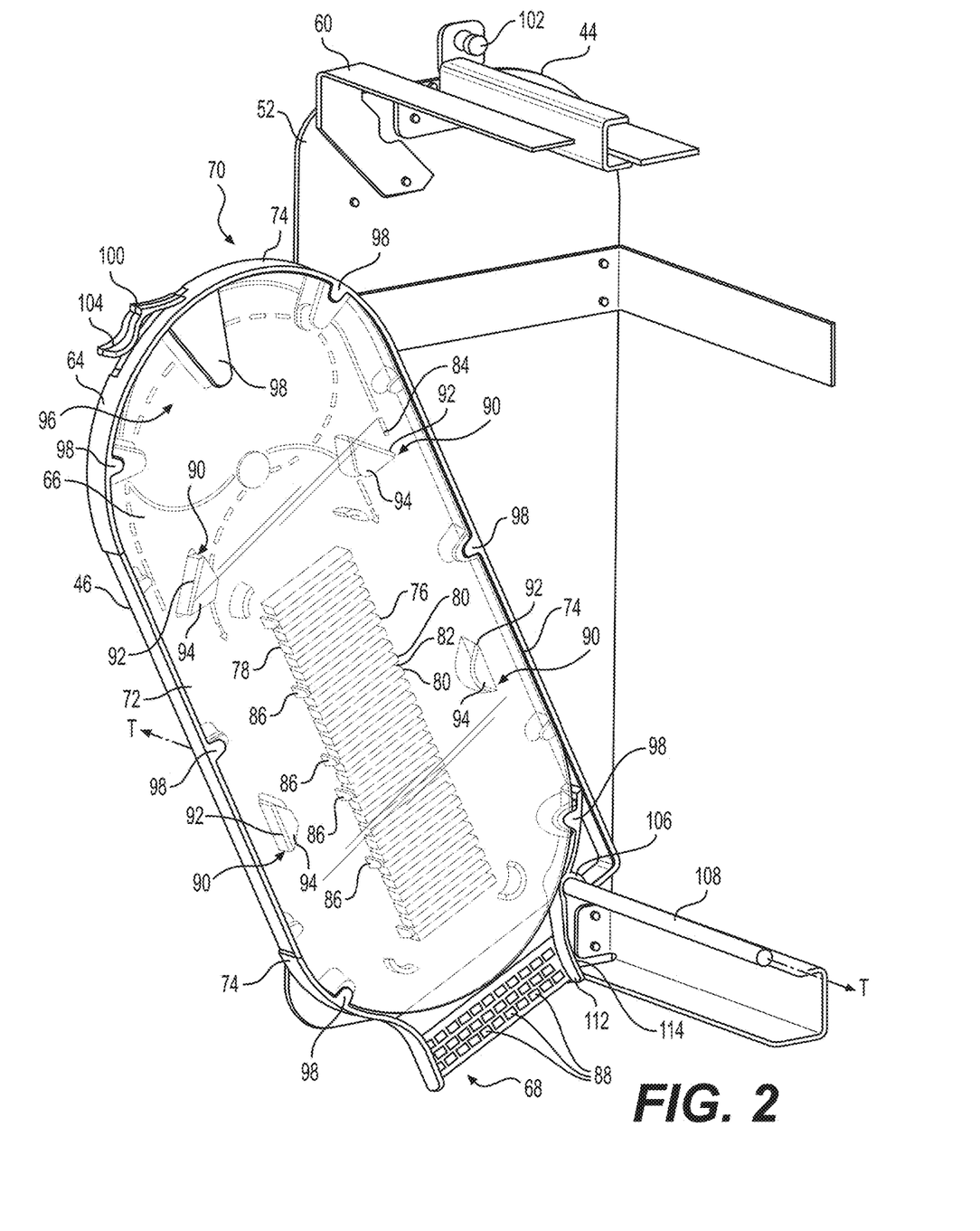
FIG. 2 is a schematic perspective view of an example splice tray pivoted relative to an example splice tray assembly support.

As shown in FIG. 1, the example splice enclosure 12 includes a splice tray assembly 14. In the examples shown, the splice tray assembly 14 includes a splice tray housing 44 pivotally coupled to the cabinet 12 and a plurality of splice trays 46 coupled to the splice tray housing 44 (e.g., pivotally coupled to the splice tray housing 44, for example, as shown in FIG. 2) and configured to provide a space for receipt of a plurality of spliced optical fibers of a plurality of cables. For example, the splice tray housing 44, in the example shown in FIG. 1, may be pivotally coupled to the cabinet 12, such that the splice tray housing 44 pivots about a housing pivot axis P extending in a direction substantially perpendicular with respect to the longitudinal axis X, for example, substantially parallel with respect to a plane in which the rear wall 18 lies. Such pivoting may render it relatively easier for a technician to gain access to one or more of the splice trays 46.

As shown in FIG. 1, some examples of the splice enclosure 10 may include one or more support rails 48 coupled to the interior of each of the first side wall 20 and the second side wall 22 and extending substantially in the direction of the longitudinal axis X The support rails 48 may be configured to assist with support of the splice tray housing 44 and splice trays 46 within the cabinet 12. Housing support brackets may be coupled to the interior of each of the first side wall 20 and the second side wall 22. The housing support brackets may include a recess, and, as shown in FIG. 1, the splice tray housing 44 may include a pivot pin 50 at each of opposite ends of the splice tray housing 44. The pivot pins 50 may be received in respective the recesses of the support brackets, for example, such that the splice tray housing 44 is pivotally supported with respect to the cabinet 12 and is able to be pivoted from an upright position to a pivoted position, for example, as shown in FIG. 1. In some examples, the cabinet 12 and the splice tray assembly 14 define a passage between the rear wall 18 of the cabinet 12 and the splice tray assembly 14 configured for passage of a plurality of cables therethrough. In some examples, the splice tray housing 14 is releasably coupled to the cabinet 12 for separation of the splice tray housing 14 and splice trays 46 from the cabinet 12, for example, to provide access to the rear part of the cabinet 12 (e.g., the part of the cabinet 12 behind the splice tray housing 14). For example, the splice tray housing 14 may be lifted out of the recesses in the support brackets.

As shown in FIG. 1, the splice tray housing 44 may include a first end wall 52 and a second end wall 54 opposite the first end wall 52. In the example shown in FIG. 1, each of the first and second end walls 52 and 54 includes a pivot pin 50 mounted thereon at a lower portion of the respective first and second end walls 52 and 54 and at a portion of the first and second end walls 52 and 54 closer to the front of the cabinet 12 (e.g., opposite the rear wall 18) when the splice tray assembly 14 is mounted in the cabinet 12. This may result in biasing the splice tray assembly 14 from pivoting outward toward the technician, unless the technician pulls an upper end of the splice tray assembly 14 outward. In some examples, a latch may be provided on the splice tray assembly 14 and/or the first and second side walls 20 and 22 of the cabinet 12 to selectively the secure the splice tray assembly 14 in the upright position. Some examples may also include a pivot limiting assembly configured to prevent the splice tray assembly 14 from pivoting past a predetermined angular displacement. For example, as shown in FIG. 1, a limiting bracket 56 may be provided on one or more of the exterior surface of the first end wall 52 or the second end wall 54 for cooperating with a limiting member coupled to the cabinet 12 to prevent the splice tray assembly 14 from pivoting past a predetermined angular displacement. The limiting member may be a cable, a hook, a strut, etc., configured to be received in a hole 58 in the limiting bracket 56 and limit the angular displacement.

As shown in FIGS. 1 and 2, in some examples, one or more of the plurality of splice trays 46 may be pivotally coupled to the splice tray housing 44, for example, such that the one or more splice trays 46 pivots relative to the splice tray housing 44 about a splice tray pivot axis T extending in a direction substantially perpendicular with respect to the longitudinal axis X of the cabinet 12 and substantially parallel with respect to the plane in which the rear wall 18 lies. Pivoting of the splices trays 46 may render it relatively easier for a technician to splice the optical fibers in the splice trays 46 and/or to check the quality of the splice or splices. The example shown in FIGS. 1 and 2 includes a retainer 60 extending between the first end wall 52 and the second end wall 54 configured to prevent one or more or the splice trays 46 from pivoting outward relative to the splice tray housing 44. For example, opposite ends of the retainer 60 may be coupled to the first and second end walls 52 and 54 of the splice tray housing 44, so that the retainer 60 may be pivoted between a first position preventing the splice trays 46 from pivoting to a second position permitting the splice trays 46 to pivot. For example, the lower portion of FIG. 1 shows the retainer 60 in the first position, preventing the splice trays 46 from pivoting relative to the splice tray housing 44, and the upper portion of FIG. 1 (and FIG. 2) shows the retainer 60 in the second position, allowing the splice trays 46 to pivot relative to the splice tray housing 44. As shown in FIG. 1, the example splice tray housing 44 also includes a divider panel 62 separating some of the splice trays 46 from others of the splice trays 46 (e.g., a first half of the splice trays 46 from a second half of the splice trays 46). This may render it relatively easier for the technician to organize the cables, optical fibers, and/or splices.

Figure 5:
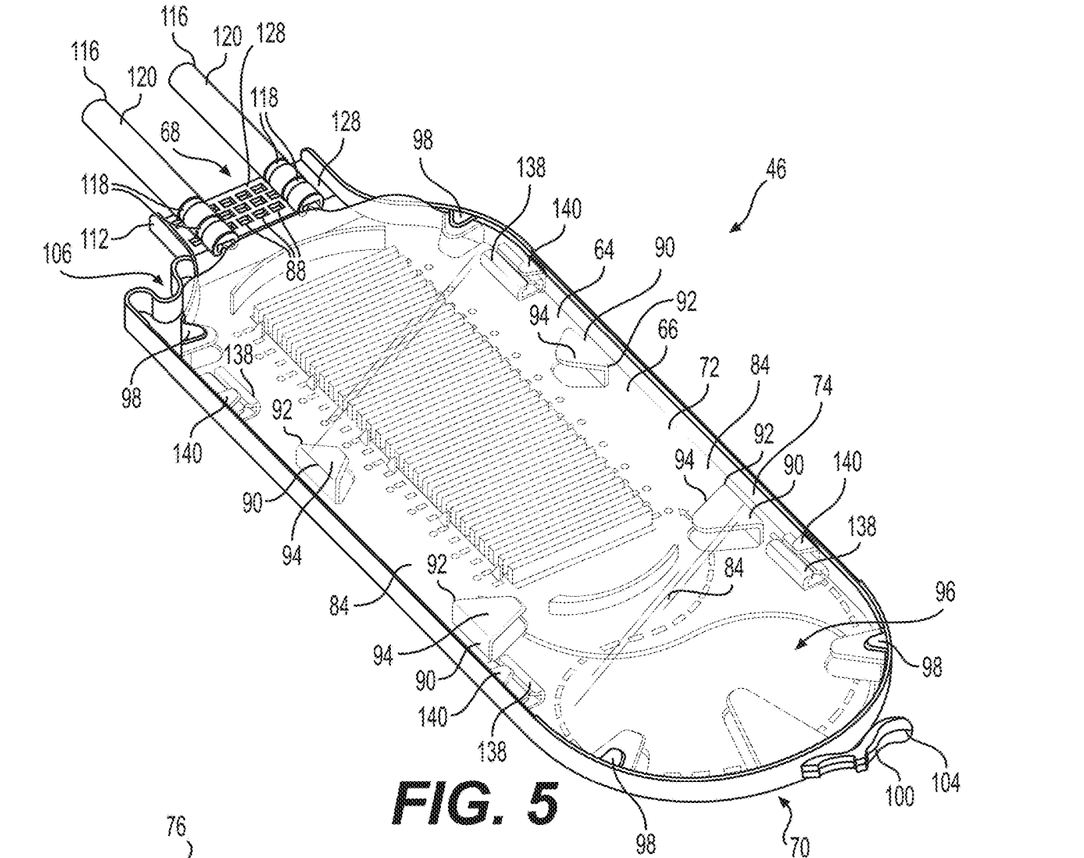
FIG. 5 is a schematic perspective view of the example splice tray shown in FIG. 3 from the end opposite the entry end with a cover.
Figure 6:
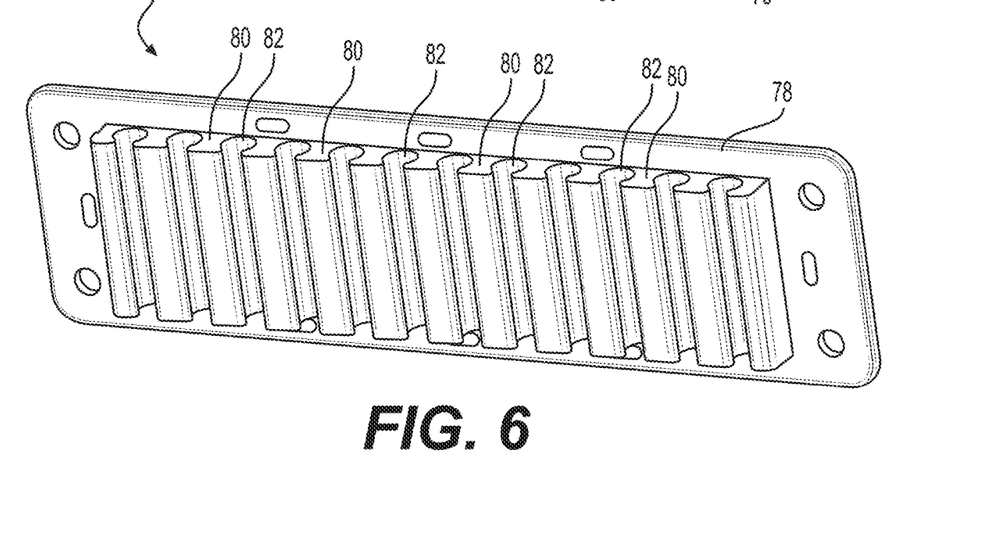
FIG. 6 is a schematic perspective view of an example splice holder.

As shown in FIGS. 2-5, one or more of the splice trays 46 may be provided for providing a space for receipt of a plurality of spliced optical fibers of a plurality of cables. For example, as shown in FIG. 2, the splice trays 46 may include a tray base 64 including a substantially planar base panel 66 having an entry end 68 and a remote end 70 spaced from the entry end 68. The base panel 66 may define a perimeter 72 and a flange 74 associated with the perimeter 72 of the base panel 66 and extending outward from the base panel 66. The example splice tray 46 shown in FIGS. 2-5 also includes a splice holder 76 configured to hold a plurality of spliced optical fibers. As shown in FIG. 6, in some examples, the splice holder 76 may include a holder base 78 removably coupled to the tray base 64, and a plurality of ribs 80 associated with the holder base 82 and defining a plurality of recesses 82 configured to receive at least one pair of spliced optical fibers. In some examples, the recesses 82 may be configured to receive splices of 40 millimeters and/or 60 millimeters. In some examples, one or more of the recesses 82 may be configured to receive splices of other sizes. As shown in FIGS. 2 and 5, the splice trays 46 may also include a cover 84 removably coupled to at least one of the tray base 64 or the splice holder 76 and substantially enclosing the splice holder 76 between the tray base 64 and the cover 84.

In some examples, the cover 84 may be translucent or transparent. Such examples may permit a technician to view the splices without removing the cover 84, for example, to check the quality of the splices using known visual splice-checking techniques.

Figures 3, 4:
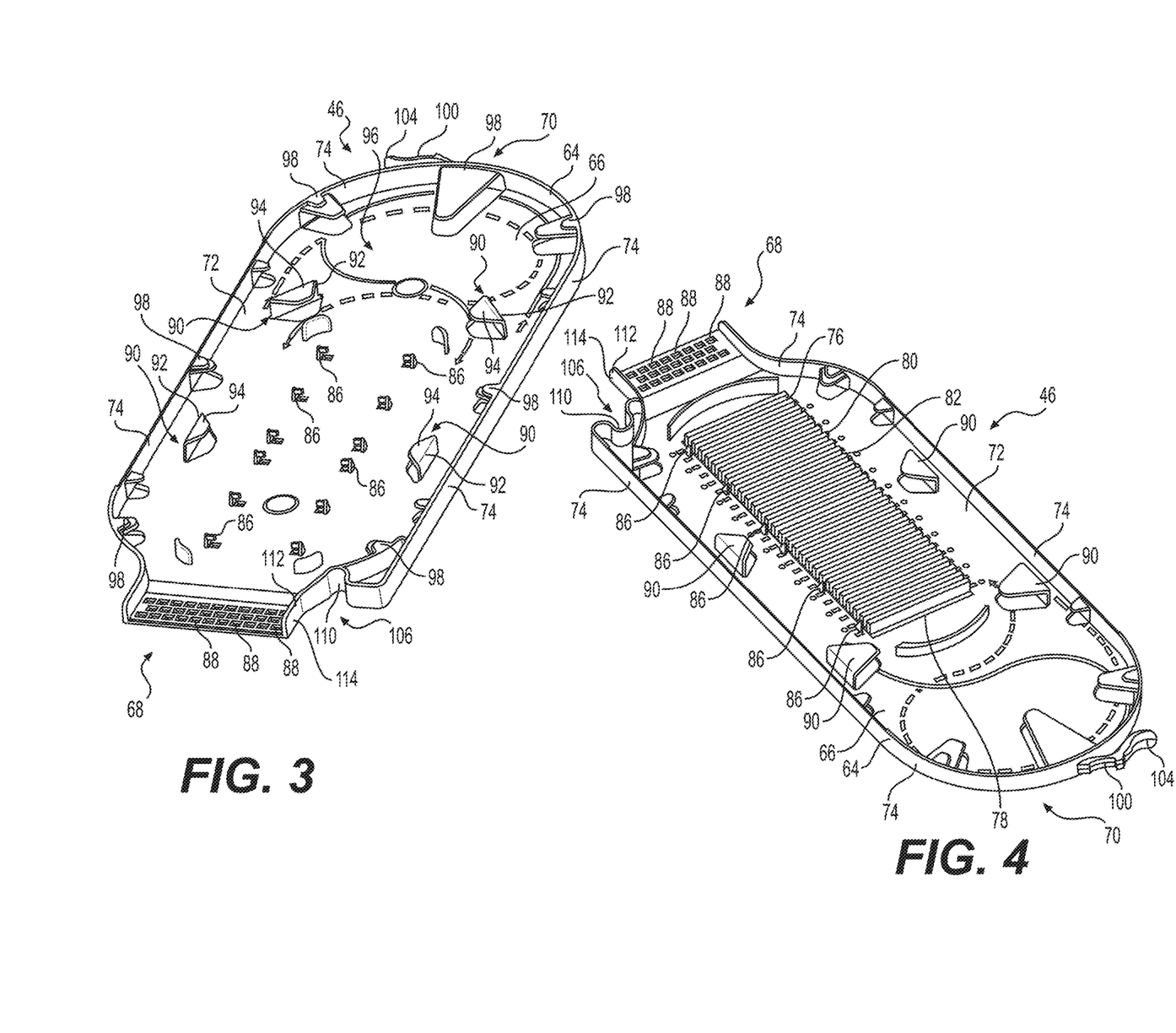
FIG. 3 is a schematic perspective view of an example splice tray shown from an example entry end without a cover.
FIG. 4 is a schematic perspective view of the example splice tray shown in FIG. 3 from an end opposite the entry end.

As shown in FIG. 3, the splice tray 46 may also include a plurality of resilient hooks 86 extending outward from the base panel 66 and removably coupling the splice holder 76 to the tray base 64. This example configuration may permit the splice holder 76 to be separated from the splice tray 46 to facilitate placement of splices in the recesses 82, after which the splice holder 76 may be reengaged with the tray base 64 via the hooks 86.

In some examples, the tray base 64 of the splice tray 46 may include a plurality of apertures 88 at the entry end 68 configured to facilitate coupling of at least one cable and/or optical fiber to the splice tray 46. For example, a cable-tie may be wrapped partially around a cable or optical fiber and threaded through two (or more) of the apertures 88, after which the cable-tie may be tightened to secure the cable and/or optical fiber to the entry end 68 of the splice tray 46.

As shown in FIGS. 2-5, the splice trays 46 may also include a plurality of retainer tabs 90 configured to retain and/or assist with organizing at least one optical fiber. For example, the retainer tabs 90 may each extend outward from the tray base 64 to a remote tab end 92. In some examples, a retainer flange 94 may extend from the remote tab end 92 in a direction substantially parallel with respect to the base panel 66. The retainer tabs 90 may assist with organizing the cables and/or optical fibers within the splice tray 46. For example, the cables may be ribbon cables that are substantially flat, including a plurality of optical fibers held in a side-by-side relationship, and the retainer tabs 90 may be configured such that a plurality of ribbon cables may be retained in an overlapping manner by the retainer tabs 90. For example, the ribbon cables may be "stacked" such that they lie flat and on top of (or adjacent) one another when received in the retainer tabs 90.

In some examples, for example, as shown in FIGS. 2-5, the tray base 64 may define a storage zone 96 between the splice holder 76 and the remote end 70 of the tray base 64. The storage zone 96 may be configured to provide space for receiving excess length of at least one cable and/or optical fiber. For examples, the excess length of cable and/or optical fiber may be looped, for example, in a coiled manner, and placed in the storage zone 96. For ribbon cables, the ribbon cables may be overlapped and stored in a looped and/or coiled manner in the storage zone 96.

The example splice tray 48 shown in FIGS. 2-5 also includes a plurality of cover tabs 98 extending from the tray base 64 and configured to removably couple the cover 84 to the tray base 64. The cover tabs 98 may facilitate access to the interior of the splice tray 46 and thereafter may be used to secure the cover 84 to the tray base 64.

As shown in FIGS. 2-5, some examples of the splice tray 46 may include a flexible latch 100 extending from an outer surface of the flange 74 of the tray base 64 (e.g., at the remote end 70 of the tray base 64). The latch 100 may be configured to selectively prevent and allow the splice tray 46 to pivot with respect to the splice tray assembly 14 to which the splice tray 46 is coupled, for example, when the retainer 60 is moved to the second position (see e.g., FIG. 2), as explained previously herein. For example, when the splice tray 46 is in the unpivoted position (see, e.g., the lower part of FIG. 1), the latch 100 may engage a latch catch 102, which is schematically shown in FIG. 2. To disengage the latch 100 from the latch catch 102, an extension 104 of the latch 100 may be flexed toward the flange 74 to disengage the latch 100 from the latch catch 102, such that the splice tray 46 may be pivoted with respect to the splice tray housing 44, for example, as shown in FIG. 2.

In some examples, such as shown in FIGS. 2-5, the splice tray 46 may include a pivot recess 106 defined by the tray base 64 and configured to cooperate with a pivot support 108 of a splice tray assembly 14 (e.g., of the splice tray housing 44) to facilitate pivoting of the splice tray 46 with respect to the splice tray assembly 14. For example, the pivot recess 106 may form a semi-circular bearing surface 110 (see FIG. 3) for rotation relative to the pivot support 108. Some examples may also include a pivot stop 112 associated with the pivot recess 106 and configured to limit a pivot angle through which the splice tray 46 pivots relative to the splice tray assembly 14 (e.g., the splice tray housing 44). In some examples, the pivot stop 112 may include an abutment surface 114 (see FIG. 3) located adjacent the pivot recess 106 and configured to engage a portion of the pivot support 108, thereby preventing the splice tray 46 from pivoting relative to the splice tray housing 44 beyond a predetermined angle of displacement.

Figures 7, 8:
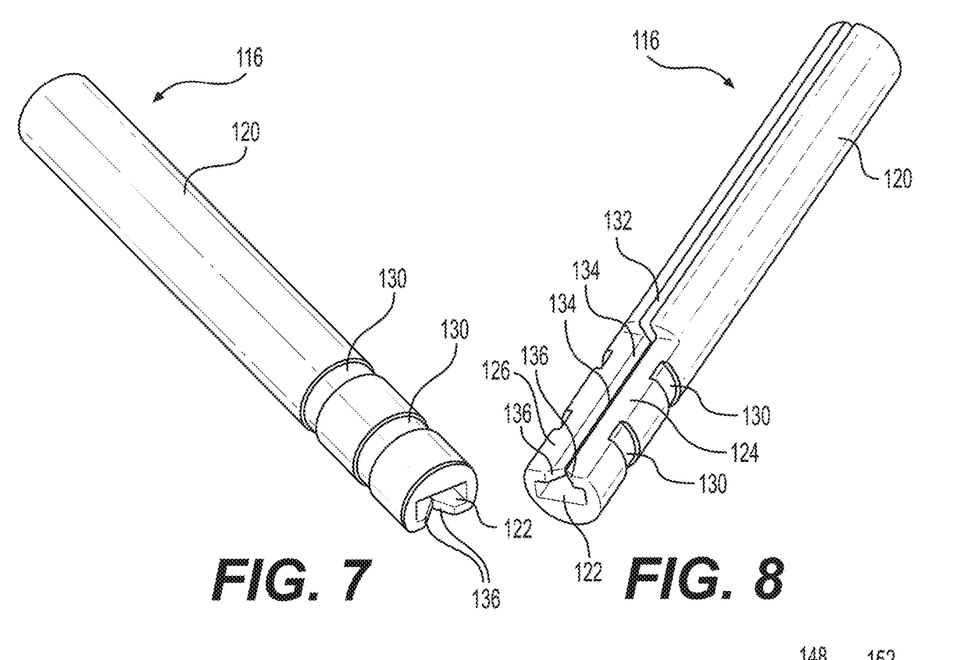
FIG. 7 is a schematic perspective view from one side of an example transition tube.
FIG. 8 is a schematic perspective view from another side of the example transition tube shown in FIG. 7.

As shown in FIGS. 5, 7, and 8 one or more transition tubes 116 may be provided for securing the cable and/or optical fibers to the splice tray 46 at a point in which the cable and/or optical fibers enter the splice tray 46. For example, the transition tube 116 may receive a cable and/or optical fibers, and the transition tube 116 may be coupled to the entry end 68 of the splice tray 46, for example, as shown in FIG. 5. In some examples, one or more cable-ties 118 may be used to secure the transition tubes 116 to the entry end 68 of the splice tray 46 by being wrapped partially around the transition tube 116, passed through two or more of the apertures 88 in the entry end 68 of the tray base 64, and tightened about the transition tube 116.

As shown in FIGS. 7 and 8, some examples of the transition tube 116 may include an elongated tubular member 120 defining an internal passage 122, which in some examples, may define a substantially rectangular cross-section for receipt of at least one ribbon cable (e.g., a plurality of overlapping ribbon cables). It is contemplated that the internal passage 122, in some examples, may define a cross-section other than rectangular, such as, for example, a circular or semi-circular cross-section for receipt of cables and/or optical fibers that are not ribbon cables. As shown in FIGS. 7 and 8, some examples of the transition tube 116 may include a mating section 124 presenting a substantially planar surface 126 for abutting the entry end 68 of the tray base 64. In some examples, the entry end 68 of the tray base 64 may present a substantially planar surface 128, and the substantially planar surface 126 of the mating section 124 of the transition tube 116 may face the substantially planar surface 128 of entry end 68, and thus, when the transition tube 116 is secured against the tray base 64, rotation of the transition tube 116 and the cables and/or optical fibers passing through the transition tube 116 is substantially prevented.

As shown in FIGS. 7 and 8, some examples of the transition tube 116 may include at least one recess 130 (e.g., a circumferential recess) extending at least partially around an outer surface of the transition tube 116 and configured to receive a cable-tie 118 for coupling the transition tube 116 to the tray base 64 via the apertures 88 at the entry end 68 of the tray base 64. Some examples of the recesses 130 may assist with preventing the transition tube 116 from displacing longitudinally relative to the splice tray 46 once the transition tube 116 is secured to the tray base 64 of the splice tray 46.

Some examples of the transition tube 116 may also include a longitudinal slot 132 extending at least partially the length of the transition tube 116 and configured to receive a cable (e.g., a ribbon cable) therethrough. For example, the slot 132 may extend the length of the transition tube 116, and a ribbon cable may be inserted into the transition tube 116 via the slot 132, for example, without the need to pass the end of the ribbon cable into one end of the transition tube 116. Thus, a technician may slide the transition tube 116 onto one or more ribbon cables via the slot 132. In the example shown in FIGS. 7 and 8, the slot 132 includes chamfered edges 134 configured to render it relatively easier to insert a ribbon cable into the slot 132. Some examples of the slot 132 may include tapered ends 136 at at least one end of the transition tube 116 (e.g., the end including the mating section 124) to facilitate insertion of ribbon cables into the slot 132.

Figure 9:
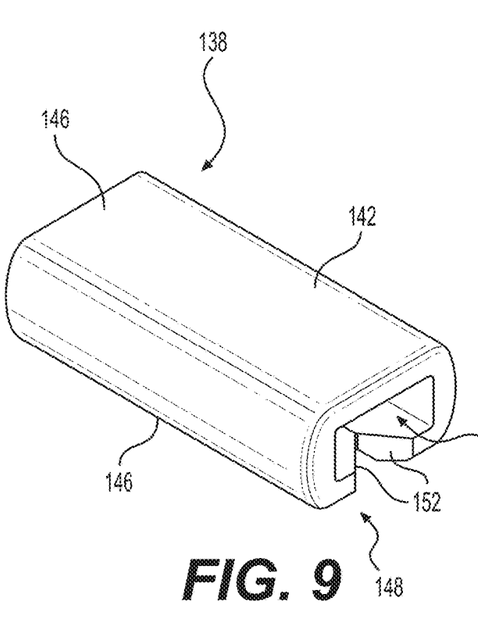
FIG. 9 is a schematic perspective view from one side of an example anti-twist clip.
Figure 10:
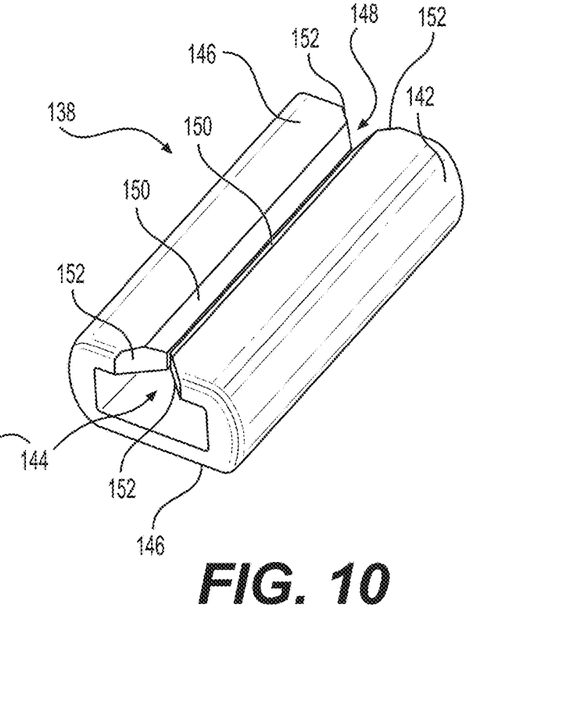
FIG. 10 is a schematic perspective view from another side of the anti-twist clip shown in FIG. 9.

FIGS. 9 and 10 show an example anti-twist clip 138 configured to be coupled to the tray base 64 and prevent ribbon cable from twisting. For example, FIG. 5 shows example anti-twist clips 138 coupled to the splice tray 46 via example resilient clip retainers 140 associated with (e.g., coupled to) the base tray 64. The anti-twist clips 138 may be configured to receive a plurality of ribbon cables in an overlapping relationship and may prevent the ribbon cables from becoming twisted in the splice tray 46.

As shown in FIGS. 9 and 10, some examples of the anti-twist clips 138 may include a tubular member 142 defining an internal passage 144, which in some examples, may define a substantially rectangular cross-section for receipt of at least one ribbon cable (e.g., a plurality of overlapping ribbon cables). It is contemplated that the internal passage 144, in some examples, may define a cross-section other than rectangular, such as, for example, a circular or semi-circular cross-section for receipt of cables and/or optical fibers that are not ribbon cables. As shown in FIGS. 9 and 10, some examples of the anti-twist clips 138 may include a pair of substantially planar surfaces 146 on opposite sides of the tubular member 142. The surfaces 146 may provide the anti-twist clips 138 with a relatively a lower profile for fitting in the interior of the splice trays 46 and may present surfaces for abutting the base panel 66 of the tray base 64 and for engagement with the respective clip retainers 140 when installed in the splice tray 46. The anti-twist clips 138, in some examples, may be configured for ease of engagement and disengagement with the splice tray 46, for example, so that a technician may be able to insert the cables and/or optical fibers into the internal passage 144 of the anti-twist clip 138 with the anti-twist clip 138 separated from the splice tray 46, and thereafter engage the anti-twist clip 138 with the clip retainers 140 before installing the cover 84 onto the splice tray 46. In some examples, the tray base 64 may present a substantially planar surface 128, and one of the substantially planar surfaces 146 of the anti-twist clip 138 may face the substantially planar surface 128, and thus, when the anti-twist clip 138 is secured against the tray base 64, rotation of the anti-twist clip 138 and/or the cables and/or optical fibers passing through the anti-twist clip 138 is substantially prevented.

As shown in FIGS. 9 and 10, some examples of the anti-twist clip 138 may include a longitudinal slot 148 extending at least partially the length of the anti-twist clip 138 (e.g., the entire length) and configured to receive a ribbon cable therethrough. For example, the slot 148 may extend the length of the anti-twist clip 138, and a ribbon cable may be inserted into the anti-twist clip 138 via the slot 148, for example, without the need to pass the end of the ribbon cable into one end of the anti-twist clip 138. Thus, a technician may slide the anti-twist clip 138 onto one or more ribbon cables via the slot 148. In the example shown in FIGS. 9 and 10, the slot 148 includes chamfered edges 150 configured to render it relatively easier to insert a ribbon cable into the slot 148. Some examples of the slot 148 may include tapered ends 152 at at least one end of the anti-twist clip 138 to facilitate insertion of ribbon cables into the slot 148.

Figure 11:
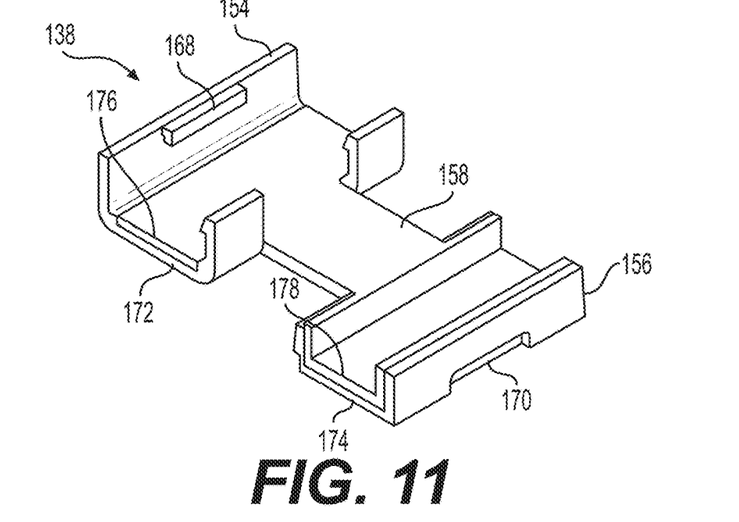
FIG. 11 is a schematic perspective view of another example anti-twist clip shown from one side in an unassembled condition.
Figure 12:
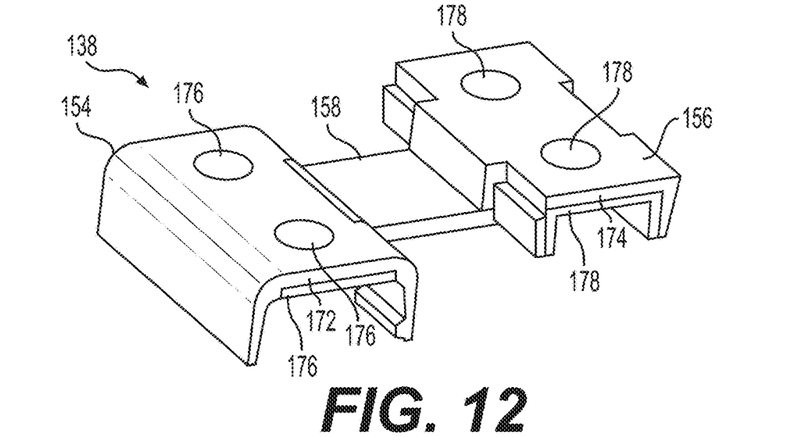
FIG. 12 is a schematic perspective view of the example anti-twist clip shown in FIG. 11 from another side and in an unassembled condition.
Figure 13:
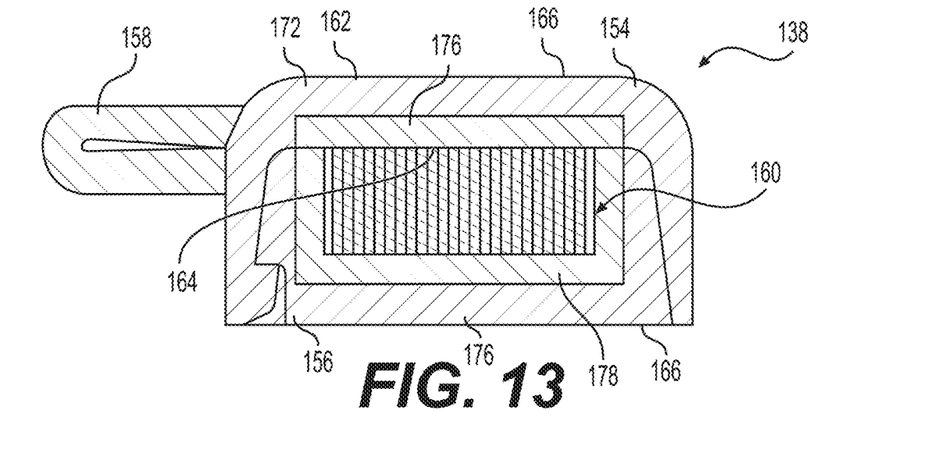
FIG. 13 is a schematic side section view of the example anti-twist clip shown in FIGS. 11 and 12 shown in an assembled condition surrounding a plurality of example optical fibers.

FIGS. 11-13 show another example of an anti-twist clip 138. The example shown in FIGS. 11-13 includes a first mating part 154, a second mating part 156 configured to engage the first mating part 154, and a flexible tie member 158 coupled to both the first mating part 154 and the second mating part 156 and configured to permit the first and second mating halves 154 and 156 to remain coupled to one another when not engaged with one another. The first and second mating halves 154 and 156, when engaged with one another (see FIG. 13) are configured to present an anti-twist clip 138 similar in function to the example anti-twist clip 138 shown in FIGS. 9 and 10.

For example, when the first and second mating halves 154 and 156 are engaged with one another, for example, as shown in FIG. 13, the anti-twist clip 138 is configured to be coupled to the tray base 64 and prevent ribbon cable from twisting. The anti-twist clip 138 shown in FIGS. 11-13 may be coupled to the splice tray 46 via the example resilient clip retainers 140 associated with (e.g., coupled to) the base tray 64. The anti-twist clips 138 may be configured to receive a plurality of ribbon cables 160 in an overlapping relationship and may prevent the ribbon cables from becoming twisted in the splice tray 46, for example, as shown in FIG. 13.

As shown in FIG. 13, the example anti-twist clip 138 shown in FIGS. 11-13 may be configured to form a tubular member 162 defining an internal passage 164, which, in some examples, may define a substantially rectangular cross-section for receipt of at least one ribbon cable (e.g., a plurality of overlapping ribbon cables). It is contemplated that the internal passage 164, in some examples, may define a cross-section other than rectangular, such as, for example, a circular or semi-circular cross-section for receipt of cables and/or optical fibers that are not ribbon cables. As shown in FIG. 13, the example anti-twist clip 138 shown in FIGS. 11-13 may include a pair of substantially planar surfaces 166 on opposite sides of the tubular member 162. The surfaces 166 may provide the anti-twist clips 138 with a relatively a lower profile for fitting in the interior of the splice trays 46 and may present surfaces for abutting the base panel 66 of the tray base 64 and for engagement with the respective clip retainers 140 when installed in the splice tray 46. The anti-twist clips 138, in the example shown in FIGS. 11-13, may be configured for ease of engagement and disengagement with the splice tray 46, for example, so that a technician may be able to insert the cables and/or optical fibers into the internal passage 144 of the anti-twist clip 138 with the anti-twist clip 138 separated from the splice tray 46, fold over the tie member 158 to engage the first and second mating halves 154 and 156 with one another, and thereafter engage the anti-twist clip 136 with the clip retainers 140 before installing the cover 84 onto the splice tray 46. In some examples, the tray base 64 may present a substantially planar surface 128, and one of the substantially planar surfaces 166 of the anti-twist clip 138 may face the substantially planar surface 128, and thus, when the anti-twist clip 138 is secured against the tray base 64, rotation of the anti-twist clip 138 and/or the cables and/or optical fibers passing through the anti-twist clip 138 is substantially prevented. The example anti-twist clip 138 shown in FIGS. 11-13 may include a catch 168 on the first mating part 154 configured to engage a recess 170 on the second mating part 156, for example, as shown in FIG. 11.

In some examples, a first portion 172 of the first mating part 154 and a first portion 174 of the second mating part 156 may be formed by a first material. A second portion 176 of the first mating part 154 and a second portion 178 of the second mating part 156 may be formed by a second material. The second material may also form the tie member 158. In some examples, the second material is relatively more flexible and/or elastic than the first material. In some examples, the second portions 176 and 178 of the respective first and second mating halves 154 and 156 may be integrally formed with the tie member 158.

Although this subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

EXAMPLE CLAUSES

A. An example splice tray for providing a space for receipt of a plurality of spliced optical fibers of a plurality of cables, the splice tray comprising:
  a tray base comprising:
  a substantially planar base panel having an entry end and a remote end spaced from the entry end, the base panel defining a perimeter; and
  a flange associated with the perimeter of the base panel and extending outward from the base panel;
  a splice holder configured to hold a plurality of spliced optical fibers, the splice holder comprising:
    a holder base removably coupled to the tray base; and
    a plurality of ribs associated with the holder base and defining a plurality of recesses configured to receive at least one spliced optical fiber; and
  a cover removably coupled to at least one of the tray base or the splice holder and substantially enclosing the splice holder between the tray base and the cover.

B. The splice tray of example A, further comprising a plurality of resilient hooks extending outward from the base panel and removably coupling the splice holder to the tray base.

C. The splice tray of example A or example B, wherein the tray base comprises a plurality of apertures at the entry end configured to facilitate coupling of at least one cable to the splice tray.

D. The splice tray of any one of example A through example C, further comprising a plurality of retainer tabs configured to retain at least one optical fiber, the plurality of retainer tabs extending outward from the tray base to a remote tab end and including a retainer flange extending from the remote tab end in a direction substantially parallel with respect to the base panel.

E. The splice tray of any one of example A through example D, wherein the tray base defines a storage zone between the splice holder and the remote end of the tray base, the storage zone configured to provide space for receiving excess length of at least one optical fiber.

F. The splice tray of any one of example A through example E, further comprising a plurality of cover tabs extending from the tray base and configured to removably couple the cover to the tray base.

G. The splice tray of any one of example A through example F, further comprising a flexible latch extending from an outer surface of the flange of the tray base, the latch configured to selectively prevent and allow the splice tray to pivot with respect to a splice tray assembly in which the splice tray is received.

H. The splice tray of any one of example A through example G, further comprising a pivot recess associated with the tray base and configured to cooperate with a pivot support of a splice tray assembly to facilitate pivoting of the splice tray with respect to the splice tray assembly.

I. The splice tray of any one of example A through example H, further comprising a pivot stop associated with the pivot recess and configured to limit a pivot angle through which the splice tray pivots relative to the splice tray assembly.

J. The splice tray of any one of example A through example I, further comprising a plurality of retaining clips associated with the tray base and configured to retain anti-twist clips configured to prevent ribbon cable from twisting.

K. An example splice tray for providing a space for receipt of a plurality of spliced optical fibers of a plurality of cables, the splice tray comprising:
  a tray base comprising:
    a substantially planar base panel having an entry end and a remote end spaced from the entry end, the base panel defining a perimeter;
    a flange associated with the perimeter of the base panel and extending outward from the base panel; and
    a flexible latch extending from an outer surface of the flange of the tray base, the latch configured to selectively prevent and allow the splice tray to pivot with respect to a splice tray assembly in which the splice tray is received;
  a splice holder configured to hold a plurality of spliced optical fibers, the splice holder comprising:
    a holder base coupled to the tray base; and
    a plurality of ribs associated with the holder base and defining a plurality of recesses configured to receive at least one spliced optical fiber; and
  a cover removably coupled to at least one of the tray base or the splice holder and substantially enclosing the splice holder between the tray base and the cover.

L. The splice tray of example K, further comprising a plurality of resilient hooks extending outward from the base panel and removably coupling the splice holder to the tray base.

M. The splice tray of example K or example L, wherein the tray base comprises a plurality of apertures at the entry end configured to facilitate coupling of at least one cable to the splice tray.

N. The splice tray of any one of example K through example M, wherein the cover is one of translucent or transparent.

O. The splice tray of any one of example K through example N, further comprising a pivot recess associated with the tray base and configured to cooperate with a pivot support of a splice tray assembly to facilitate pivoting of the splice tray with respect to the splice tray assembly.

P. The splice tray of any one of example K through example O, further comprising a pivot stop associated with the pivot recess and configured to limit a pivot angle through which the splice tray pivots relative to the splice tray assembly.

Q. The splice tray of any one of example K through example P, further comprising a plurality of anti-twist clips coupled to the tray base and configured to prevent ribbon cable from twisting.

R. An example splice tray and a transition tube, the splice tray for providing a space for receipt of a plurality of spliced optical fibers of a plurality of cables and comprising:
a tray base comprising:
a substantially planar base panel having an entry end and a remote end spaced from the entry end, the base panel defining a perimeter; and
a flange associated with the perimeter of the base panel and extending outward from the base panel;
a splice holder configured to hold a plurality of spliced optical fibers, the splice holder comprising a plurality of ribs defining a plurality of recesses configured to receive at least one spliced optical fiber;
a cover removably coupled to at least one of the tray base or the splice holder and substantially enclosing the splice holder between the tray base and the cover; and
a transition tube coupled to the tray base and configured to receive at least one cable.

S. The splice tray and transition tube of example R, wherein the transition tube defines an internal passage having a substantially rectangular cross-section for receipt of at least one ribbon cable and a mating section presenting a substantially planar surface for abutting the entry end of the tray base.

T. The splice tray and transition tube of example R or example S, wherein the tray base comprises a plurality of apertures at the entry end configured to facilitate coupling of at least one cable to the splice tray, and wherein the transition tube defines at least one recess extending at least partially around an outer surface of the transition tube and configured to receive a cable tie for coupling the transition tube to the tray base via the apertures at the entry end of the tray base.

What is claimed is:

1. A splice tray for providing a space for receipt of a plurality of spliced optical fibers of a plurality of cables, the splice tray comprising:
a tray base comprising:
a substantially planar base panel having an entry end and a remote end spaced from the entry end, the base panel defining a perimeter;
a flange associated with the perimeter of the base panel and extending outward from the base panel; and
a pivot recess configured to cooperate with a pivot support of a splice tray assembly to facilitate pivoting of the splice tray with respect to the splice tray assembly,
wherein the pivoting of the splice tray is in a plane defined by the tray base;
a splice holder configured to hold a plurality of spliced optical fibers, the splice holder comprising:
a holder base removably coupled to the tray base; and
a plurality of ribs associated with the holder base and defining a plurality of recesses configured to receive at least one spliced optical fiber; and
a cover removably coupled to at least one of the tray base or the splice holder and substantially enclosing the splice holder between the tray base and the cover.

2. The splice tray of claim 1, further comprising a plurality of resilient hooks extending outward from the base panel and removably coupling the splice holder to the tray base.

3. The splice tray of claim 1, wherein the tray base comprises a plurality of apertures at the entry end configured to facilitate coupling of at least one cable to the splice tray.

4. The splice tray of claim 1, further comprising a plurality of retainer tabs configured to retain at least one optical fiber, the plurality of retainer tabs extending outward from the tray base to a remote tab end and including a retainer flange extending from the remote tab end in a direction substantially parallel with respect to the base panel.

5. The splice tray of claim 1, wherein the tray base defines a storage zone between the splice holder and the remote end of the tray base, the storage zone configured to provide space for receiving excess length of at least one optical fiber.

6. The splice tray of claim 1, further comprising a plurality of cover tabs extending from the tray base and configured to removably couple the cover to the tray base.

7. The splice tray of claim 1, further comprising a flexible latch extending from an outer surface of the flange of the tray base, the latch configured to selectively prevent and allow the splice tray to pivot with respect to a splice tray assembly in which the splice tray is received.

8. The splice tray of claim 1, further comprising a pivot stop associated with the pivot recess and configured to limit a pivot angle through which the splice tray pivots relative to the splice tray assembly.

9. The splice tray of claim 1, further comprising a plurality of retaining clips associated with the tray base and configured to retain anti-twist clips configured to prevent ribbon cable from twisting.

10. A splice tray for providing a space for receipt of a plurality of spliced optical fibers of a plurality of cables, the splice tray comprising:
a tray base comprising:
a substantially planar base panel having an entry end and a remote end spaced from the entry end, the base panel defining a perimeter;
a flange associated with the perimeter of the base panel and extending outward from the base panel;
a pivot recess configured to cooperate with a pivot support of a splice tray assembly to facilitate pivoting of the splice tray with respect to the splice tray assembly, wherein the pivoting of the splice tray is in a plane defined by the tray base; and
a flexible latch extending from an outer surface of the flange of the tray base, the latch configured to selectively prevent and allow the splice tray to pivot with respect to the splice tray assembly in which the splice tray is received;
a splice holder configured to hold a plurality of spliced optical fibers, the splice holder comprising:
a holder base coupled to the tray base; and
a plurality of ribs associated with the holder base and defining a plurality of recesses configured to receive at least one spliced optical fiber; and
a cover removably coupled to at least one of the tray base or the splice holder and substantially enclosing the splice holder between the tray base and the cover.

11. The splice tray of claim 10, further comprising a plurality of resilient hooks extending outward from the base panel and removably coupling the splice holder to the tray base.

12. The splice tray of claim 10, wherein the tray base comprises a plurality of apertures at the entry end configured to facilitate coupling of at least one cable to the splice tray.

13. The splice tray of claim 10, wherein the cover is one of translucent or transparent.

14. The splice tray of claim 10, further comprising a pivot stop associated with the pivot recess and configured to limit a pivot angle through which the splice tray pivots relative to the splice tray assembly.

15. The splice tray of claim 10, further comprising a plurality of anti-twist clips coupled to the tray base and configured to prevent ribbon cable from twisting.

\* \* \* \* \*